Feb. 4, 1969  D. P. HASS ET AL  3,425,504
STEERING MECHANISM
Filed Oct. 30, 1964  Sheet 1 of 3

INVENTOR.
DAVID P. HASS
ROBERT E. STUEMKY
ATTORNEYS

INVENTOR.
DAVID P. HASS
ROBERT E. STUEMKY
Williams, David,
Hoffmann & Yount
ATTORNEYS

United States Patent Office 3,425,504
Patented Feb. 4, 1969

3,425,504
STEERING MECHANISM
David P. Hass, Detroit, and Robert E. Stuemky, Royal Oak, Mich., assignors to Eaton Yale & Towne Inc., Cleveland, Ohio, a corporation of Ohio
Filed Oct. 30, 1964, Ser. No. 407,818
U.S. Cl. 180—1    28 Claims
Int. Cl. B62d 3/02, 1/18; F16c 1/02

ABSTRACT OF THE DISCLOSURE

A universal joint comprising a plurality of nested spring sleeves transmits rotary motion from the steering wheel of a vehicle to a driven member in the steering column of the vehicle so as to effect steering of the vehicle when the steering wheel is turned. The steering wheel is supported for pivotal movement about a tilt axis transverse to the axis of rotation of the steering wheel and is moved about the tilt axis by the action of the universal joint. The tilt axis is offest from the axis of rotation of the steering wheel. A latch mechanism holds the steering wheel in the position to which it is moved about the tilt axis. The steering wheel is also supported for movement about a tilt-away axis which is likewise offset from the axis of rotation of the steering wheel so that the universal joint also effects movement of the steering wheel about the tilt-away axis. Another latch mechanism is provided to release the steering wheel for movement about the tilt-away axis.

---

This invention relates to a drive mechanism including a universal joint operatively associated with driving and driven members to provide a drive relation therebetween and, particularly, to such a mechanism wherein the driving and driven members are supported for pivotal relative movement and the universal joint is operatively associated with the driving and driven members in such a manner as to effect the relative pivotal movement.

A principal object of the present invention is the provision of a new and improved simplified drive mechanism having a universal joint functioning to both transmit torque between the driving and driven members, as well as to effect pivotal movement of the members relatively in a direction transverse to the axes of rotation of the coupling members.

An important object of the present invention is the provision of a new and improved drive mechanism having means interconnected with rotatable driving and driven members for transmitting torque therebetween and urging the driving and driven members for relative pivotal movement about an axis extending transversely of the axis of rotation of the driving member and offset from its axis.

A further object of the present invention is the provision of a new and improved drive mechanism wherein the means interconnected with the driving and driven members includes a universal joint having loaded coil spring means functioning to apply a biasing force to the driving and driven members urging the driving and driven members for pivotal movement about the offset axis.

A still further object of the present invention is the provision of a new and improved drive mechanism, as noted in the next preceding paragraph, wherein a latch means is provided to retain the drive and driven members in a given position and, when released, allows for relative movement of the members.

Yet a further object of the present invention is the provision of a new and improved drive mechanism wherein driving and driven members are interconnected by a universal joint and one of the members is urged about a plurality of pivotal axes with respect to the other member by a universal joint of the spring type, and wherein separate latch means hold the one member from movement about each axis and are selectively releaseable to allow pivotal movement about each axis.

An additional object of the present invention is the provision of a new and improved steering mechanism for a vehicle and including a universal joint interconnected between a portion of the steering column connected to the steering wheel and another part of the steering column, and which transmits torque therebetween and is effective to pivot the steering wheel into different relative positions with respect to the steering column so that the steering wheel is thereby adjustable to suit the desires of the individual drivers of the vehicle.

Another object of the present invention is the provision of a new and improved steering mechanism wherein the steering wheel is connected with a driving member which is supported for pivotal movement relative to a driven member in a vertical plane about a tilt axis to effect vertical adjustment of the steering wheel and about a tilt-away axis to effect movement of the steering wheel to a remote position and wherein the driving member and steering wheel are urged about the tilt axis and tilt-away axis by a universal joint of the spring type which transmits torque from the driving member to the driven member.

A more specific object of the present invention is the provision of a new and improved steering mechanism, as noted in the next preceding paragraph, wherein the driving member is supported for pivotal movement about the tilt axis by a gimbal member and wherein the gimbal member, driving member, and steering wheel are supported for pivotal movement by the universal joint as a unit about the tilt-away axis.

An additional object of the present invention is the provision of a new and improved steering mechanism, as noted in the next preceding paragraph, wherein a latch means is provided for releasably latching the steering wheel to the gimbal member so as to hold the driving member and steering wheel in a predetermined position with respect to the gimbal member and, when released, permitting pivotal movement of the steering wheel relative to the gimbal by the action of the universal joint, and wherein a second latch mechanism releasably latches the gimbal member to the driven member and, when released, permits movement of the gimbal and the driving member as a unit about the tilt-away axis relative to the driving member.

A still further object of the present invention is the provision of a new, improved, simplified, and reliable steering mechanism including a steering wheel movable to different positions as desired by the vehicle operator and a latch means to retain the steering wheel in a given position and wherein the latch means in released to provide for movement of the steering wheel upon movement of the turn signal actuating lever member of the vehicle to its latch release position.

Another object of the present invention is the provision of a new and improved steering mechanism having a steering wheel which may be pivoted about an axis with respect to the steering column in order to tilt the steering wheel about a tilt-away axis to a remote position out of position wherein it would interfere with the driver of the vehicle entering or leaving the vehicle, and wherein the pivoting of the steering wheel occurs in response to actuation of a remotely controlled switch means which may be located on the dash or on the door of the vehicle, so that upon opening of the door or depression of the switch on the dash, the steering wheel will move to its out-of-the-way position.

Further objects and advantages of the present invention will be apparent to those skilled in the art to which it relates from the following detailed description thereof made with reference to the accompanying drawings forming a part of this specification and in which:

The present invention provides a drive mechanism including a universal joint for transmitting torque between driving and driven members, and wherein the driving and driven members are connected for relative pivotal movement in a direction transverse to the axis of rotation thereof. The universal joint, incorporated in the drive mechanism, is of the spring type and is constructed and arranged to effect relative pivotal movement of the members, as well as to transmit torque between the members. Such a drive mechanism may be utilized in a variety of applications in many different structural environments wherein it is desired to transmit torque between driving and driven members, as well as provide for pivotal movement therebetween. One application of this mechanism is as a steering mechanism for a vehicle for effecting movement of the steering wheel for adjustment purposes, as well as transmitting the rotation of the steering wheel from a driving member to a driven member to effect steering movement of the ground engaging wheels of the vehicle, and the preferred embodiment of the present invention, to be described hereinbelow, comprises such a steering mechanism.

The preferred embodiment of the present invention illustrated in the drawings comprises a steering mechanism 10. The steering mechanism 10 includes a steering wheel 11 operatively connected to a driving member 12 which rotates upon rotation of the steering wheel 11. The steering mechanism 10 also includes a driven member 13 which is rotated upon rotation of the steering wheel and effects turning of the wheels of the vehicle upon turning of the steering wheel. A universal joint 14 is operatively connected with the driving member 12 and driven member 13 so as to effect transmission of torque and rotary motion from the driving member to the driven member upon rotation of the steering wheel 11.

The driving member 12 comprises a rod member which supports the steering wheel 11 at one end thereof in a conventional manner. The steering wheel 11 includes a hub portion 17 mounted in encircling relation on the end of the driving member 12. A suitable nut member 18 is threaded onto the end of the driving member 12 and holds the steering wheel 11 on the end of the driving member 12 in a nonrotatable relation therewith so that upon rotation of the steering wheel, the driving member 12 will, in turn, rotate. The driven member 13 also comprises a rotatable rod member connected at one end in any suitable manner to actuate the turning of the wheels of the vehicle in which the steering mechanism 10 is utilized.

The driving member 12 and the driven member 13 extend toward each other and have adjacent ends which are spaced apart. The end of the driving member 12 adjacent the driven member 13 has an enlarged flange portion 20 thereon having an arcuate channel groove 21 therein which intersects the outermost axial surface of the flange 20 and which faces the member 13. The end of the member 13 adjacent the driving member 12 has a similar flange member 25 having a circular arcuate groove or channel 26 which intersects the outermost axial surface 27 of the flange 25 and which faces the groove or channel 21 in the driving member 12, for a purpose to be described hereinbelow.

The universal joint 14 operatively connects the driving and driven members 12, 13 and transmits torque and rotary motion therebetween so that upon rotation of the driving member 12, the driven member 13 likewise is rotated. The universal joint functions to transmit torque from the driving member 12 to the driven member 13 in any direction depending upon the direction of rotation of the steering wheel 11 so as to effect steering of the vehicle in a direction depending upon the direction of rotation of the steering wheel. The universal joint 14 is of the spring type and is in the form of a cylinder comprised of a plurality of coil springs with the opposite ends thereof suitably connected with the driving and driven members. One end of the universal joint is suitably secured in the groove 21 in the driving member 12, and the other end of which is suitably secured in the groove 26 in the flange 27 of the driven member and thereby drivingly connects these members. The connection of the opposite ends of the universal joint in the grooves or channels 21, 26, respectively, is preferably provided by a press fit therebetween; however, other methods of connection may be used.

The construction of the universal joint 14 is similar to that shown and described in detail in copending application Ser. No. 357,216, now patent No. 3,245,228. It should suffice for purposes of this description to state that the universal joint comprises a plurality of nested sleeve spring units 28, 28a, 28b. The spring units extend coaxially and are nested or telescoped together, with the spring unit 28 being the inner unit, the spring unit 28a the immediate unit, and the spring unit 28b the outer unit. Each of the spring units is preferably formed of a plurality of separate interdigitated spring members. The opposite ends of the spring units are suitably connected to the flange members 20, 25, respectively, as noted hereinabove.

Figure 7:
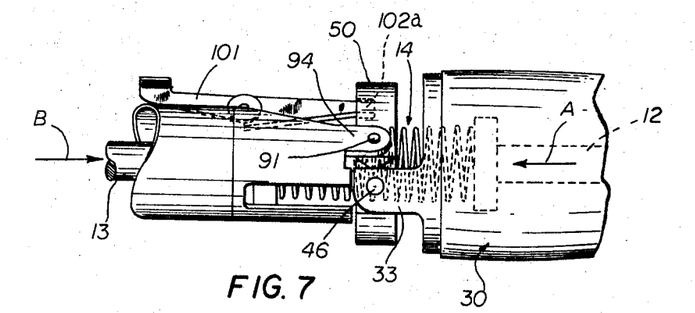
FIGS. 7, 8, and 9 are schematic views illustrating different operative positions of the mechanism shown in FIG. 1.

The universal joint 14 is loaded so as to apply a biasing force to the driving and driven members 12, 13. Specifically, the universal joint 14 is pre-extended so that the adjacent helices of the springs forming the joint are spaced axially apart. Due to the pre-extension or stretched condition of the universal joint, the universal joint tends to return to its normal or unextended position and thereby applies a biasing force to the driving and driven members 12, 13, urging the members 12, 13 toward each other, for a purpose as will be described hereinbelow. The force applied by the universal joint 14 to the driving and driven members effectively acts on the driving and driven members on the axis thereof, as indicated by the arrows A, B in FIGS. 7, 8 and 9.

From the above description, it can be readily appreciated that upon rotation of the steering wheel 11, the driving member 12 is rotated. The universal joint 14 transmits the torque from the driving member 12 to the driven member 13 through the universal joint. It should also be readily apparent that because of the positioning of the universal joint between the driving and driven members, the driving member 12 may be pivoted or moved relative to the driven member 13 without interrupting the transmission of torque and motion therebetween. The steering wheel 11 and driving member 12 may be moved transversely of the axis of rotation thereof to adjust position of the steering wheel 11 to suit the vehicle driver.

The driving member 12 and steering wheel 11 are supported for pivotal movement in a vertical plane about a horizontal pivot axis 29 for adjustment purposes. The driving member 12 is supported for pivotal movement relative to the driven member 13 by a housing member 30. The housing member 30 includes a main housing portion 31 and a pair of arm members 32, 33 which extend from the main housing portion 31 toward the driving member 12. The rotatable driving member 12 is rotatably supported within the main housing portion 31 by a plurality of bearings 34, 35. Means is provided for holding the driving member 12 in an axially fixed position with respect to the housing 31. This means includes a pair of axially spaced thrust bearing means 40, 41. The thrust bearing means 40 is interposed between the main housing portion 31 and the flange 20. The thrust bearing means 41 is interposed between the main housing portion 31 at the forward end thereof and a split ring 42 which is secured on the driving member 12.

The housing 30 of the steering mechanism 10 is pivotally supported for rotation about the axis 29 which is offset below the axis of rotation of the driving member 12 and extends transverse thereto. The pivotal axis 29 about which the housing member 30 is rotatable, is provided by a pair of pivot pins 45, 46 which extend through suitable openings in the arm members 32, 33, respectively, and into a gimbal member 50. The gimbal member 50 which supports the pin members 45, 46 comprises a hollow or apertured ring member which encircles the universal joint approximately midway between its ends, and supports the pin members 45, 46. The gimbal member also includes a projecting portion 52 which extends from the ring portion thereof axially toward the steering wheel 11 and adjacent to the main housing member 31. The arm members 32, 33 are movable about the axis of the pivot pins 45, 46, and thus the pin members 45, 46 support the main housing member 30 for rotation about the pivot axis 29 provided by the pins 45, 46. The pins 45, 46 are located below the axis of rotation of the universal joint 14 and are located intermediate the ends thereof and approximately centrally thereof. The pivot axis provided by the pins 45, 46 is thus offset below the axis of the universal joint but extends transverse thereto and crosses or passes the axis of rotation of the joint intermediate the ends of the joint. It should be apparent therefore, that the main housing member 31 and the driving member 12 may be pivoted about the axis of the pins 45, 46 in a substantially vertical direction so as to change the inclination of the steering wheel relative to the vehicle driver.

The steering mechanism 10 also includes latch means 60 for latching and releasably locking the steering wheel 11 in any of a plurality of tilted positions about the pivot axis 29 provided by the pins 45, 46. The latch means 60 includes a latch member 61 which is pivotally supported at 62 for movement relative to the main housing member 31. The latch member 61 has a plurality of recesses or grooves 63 in a surface thereof which faces the portion 52 of the gimbal 50. The portion 52 of the gimbal 50 carries a pin member 64 which is adapted to be received in any of the plurality of recesses 63 in the latch member 61. When the pin member 64 is positioned in any of the recesses 63 in the latch member 61, the main housing member and driving member 12 is thereby locked thereto so as to prevent movement of the steering wheel 11 about the axis of the pins 45, 46. The latch member 61 is biased into a position wherein is normally in latching engagement with the pin member 64 by a suitable spring member 61a which is received in a bore 61b in the main housing portion 31.

Figures 2, 3, 4:
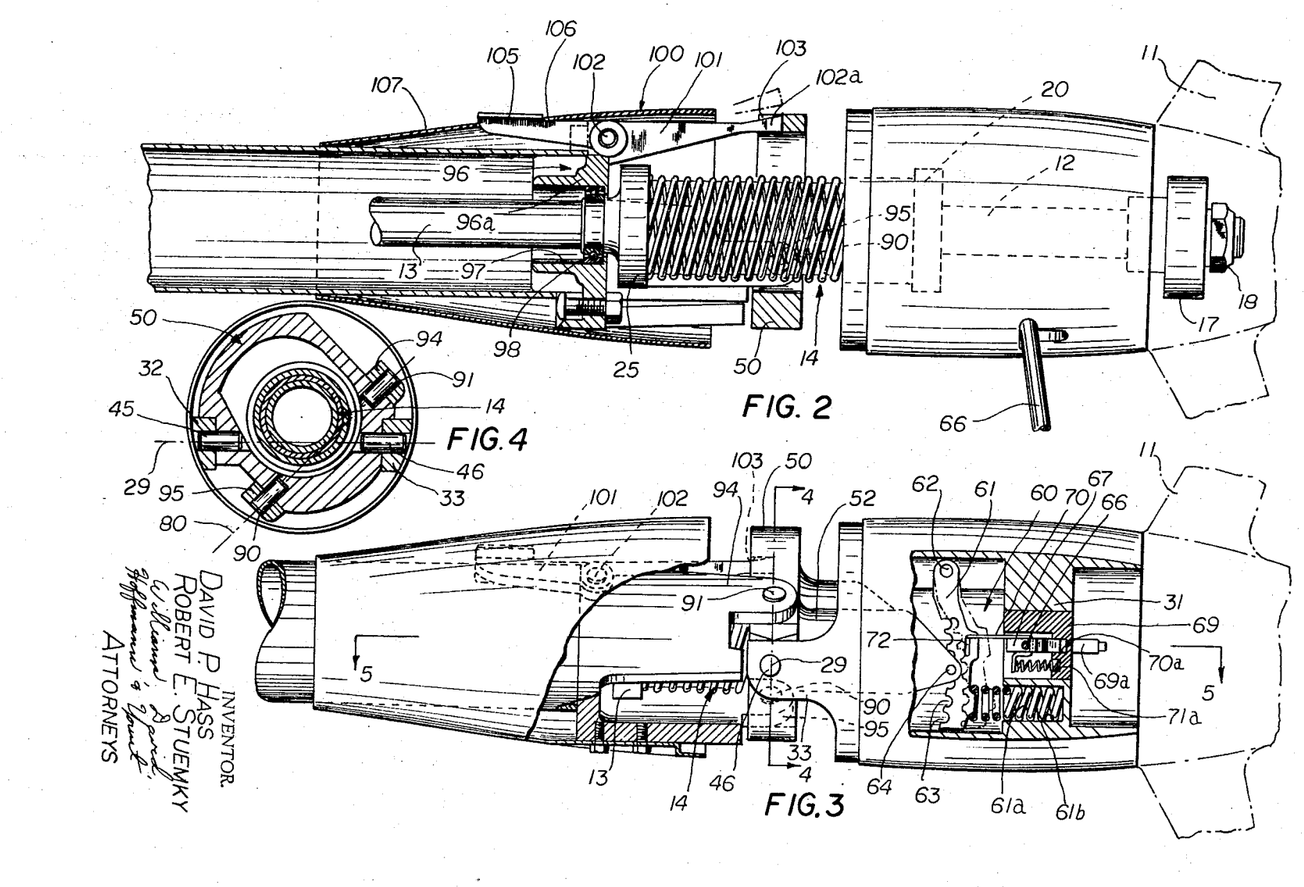
FIG. 2 is a cross-sectional view of the mechanism shown in FIG. 1, taken approximately along the section line 2—2 of FIG. 1 with parts in elevation.
FIG. 3 is a side elevational view of the steering mechanism shown in FIG. 1, with parts in section, looking at the steering mechanism of FIG. 1, in the direction of arrows 3—3.
FIG. 4 is an axial sectional view of the steering mechanism shown in FIG. 3, taken approximately along the section line 4—4 of FIG. 3.
Figure 5:
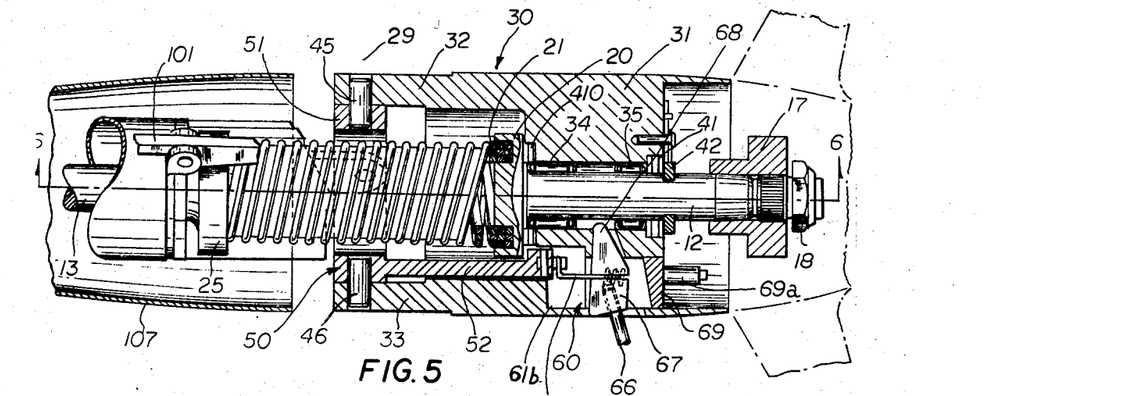
FIG. 5 is an axial sectional view of the mechanism shown in FIG. 3, taken approximately along the section line 5—5 of FIG. 3.
Figure 6:
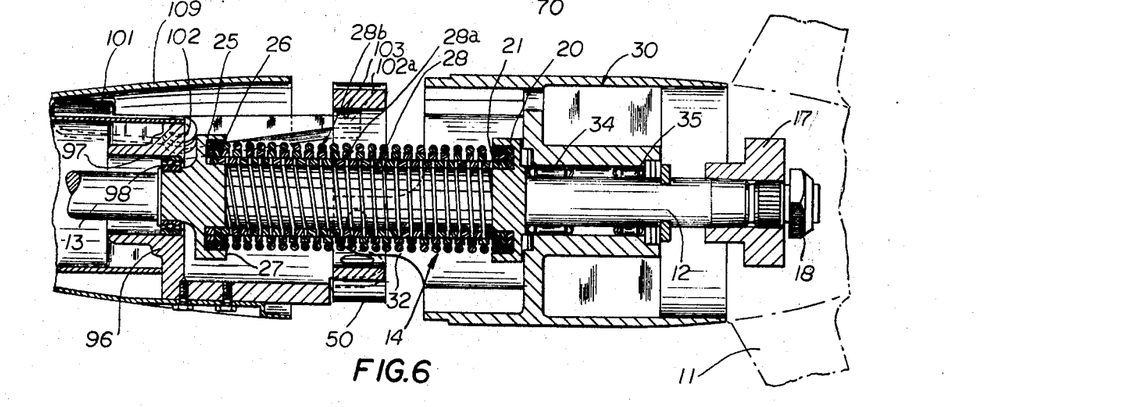
FIG. 6 is an axial sectional view of the mechanism shown in FIG. 5, taken approximately along the section line 6—6 of FIG. 5.

The latch mechanism 60 includes a latch release means operable to move the latch member 61 in a direction away from the pin 64 and toward the steering wheel 11, as viewed in FIG. 3, against the bias of spring 61a, thereby removing the pin 64 from the recesses 63 in the latch member 61 and, thus, freeing the housing 30 and the main housing member 31 for movement about the axis of the pins 45, 46. The latch release mechanism may take many forms but preferably, as shown, comprises a tilt release lever member 66 which is pivotally supported by the main housing 31 and extends outwardly thereof adjacent to the steering wheel 11.

The tilt release lever member 66 functions also as the turn signal indicator lever and extends into the main housing 31 through a suitable opening therein and is connected to a block member 67 which has a cylindrical surface 68 thereon which bears against the housing 31 and acts as a fulcrum for the block member 67 and permits universal movement of the block member 67 in the housing. The block member 67 is supported in a housing 69 which has a projection 69a thereon, and specifically is received in a slot 70a in the housing member 69. The block member 67 is also connected with the latch member 61 by means of a suitable connecting member 70 which comprises an elongated wire-like member which is connected at one end to the member 61 and its other end extends through an opening in the block member 67. The extreme outer end portion of the member 70 extends beneath the block member 67 and is engaged by a spring member 71a acting between the member 69 and the member 70.

From the above description, it should be apparent that upon movement of the lever member 66 in the direction of the steering wheel against the bias of the spring member 61a, the connecting member 70 is pulled in a direction toward the steering wheel 11 which, in turn, effects movement of the latch member toward the steering wheel, thereby pulling the latch member 61 away from the pin member 64. Upon release of the lever member 66, the spring member 61a functions to return the lever member to its normal position.

Figure 1:
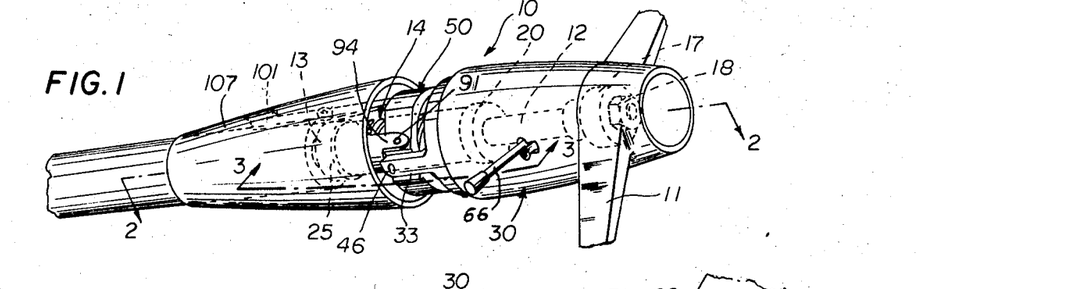
FIG. 1 is a perspective view of a portion of a steering mechanism embodying the present invention.

Upon raising the lever member 66 or lowering the lever member 66, as viewed in FIG. 1, the block member 67 is moved therewith and, because of its position in the slot 70a in the housing member 69, causes rotation of the housing member and, in turn, rotation of the projection 69a thereon. The projection 69a is a conventional projection for actuating the switch contacts of the turn signal mechanism, not shown. Thus, it can be seen that the lever member 66 functions as the turn signal lever as well as the tilt release lever.

Figure 8:
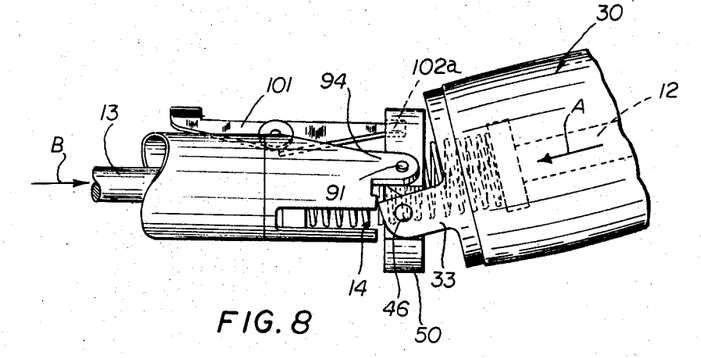

The latch member 61, as stated hereinabove, when moved from its latching position shown in FIG. 2 to an unlatching position, as shown in dot-dash lines in FIG. 2, disconnects the housing 30 and permits the housing 30 to be pivoted about the axis of the pin members 45, 46. As best seen in the schematic views 6 and 7 and as described hereinabove, the pivot axis provided by the pins 45, 46 is below the axis of rotation of the universal joint 14 and the driving and driven members. Moreover, as stated hereinabove, the universal joint is pre-extended and functions to apply a force in the direction of arrows A, B of FIG. 7. The force applied to the drive member 12, as indicated by the arrow A, tends to pull the drive member 12 toward the driven member 13. This force is applied to the drive member 12 at a location offset from the pivot axis provided by the pins 45, 46 and functions to pull the main housing 31, the driving member 12, and steering wheel 11 about the axis of the pins 45, 46. Thus, when the latch means 60 is released, the universal joint effects movement of the driving member 12 about the axis of the pins 46 without the need of the operator physically pushing or applying a force to move the steering wheel. The position of the parts shown in FIG. 8 is an example of their position when the steering wheel has been tilted upwardly. The operator need only manually stop the movement of the steering wheel by the universal joint when the steering wheel is in the position which he desires, at which position, the latch means 60 is reengaged so as to lock the steering mechanism in the desired position. In order to move the steering wheel downwardly, it is necessary to manually force the steering wheel downwardly against the action of the universal joint tending to move it upwardly about the axis 29.

The steering mechanism 10 is preferably constructed so as to permit swinging away of the steering wheel 11 to a position remote from a steering position. When in the remote position, the steering wheel 11 does not interfere with the driver entering or leaving the driver's seat. The swinging away of the steering wheel is effected by pivoting the steering wheel about a tilt-away axis 80 provided by the axis of pivot pins 90, 91. The pivot pins 90, 91 extend into respective openings in the gimbal member 50 and are located so as to provide the tilt-away axis 80 extending transverse to the tilt axis 29 provided by the pins 46, 47, and the tilt-away axis is disposed at an acute angle with respect to the tilt axis, as best seen in FIG. 4, so as to provide for tilt-away in a plane which forms an acute angle to the tilt plane. The pivot pins 90, 91 are suitably supported in arm members 94, 95, respectively, of a lower housing member 96. The arms 94, 95 of the lower housing member 96 extend forwardly from a base portion 96a thereof toward the gimbal 50 and are provided with openings to receive the pin members 90, 91 which are also received in openings in the gimbal member, as noted above. The base portion 96a of the housing member 96, remote from the gimbal member 50 is provided with a circular bore 97 therethrough in which is received a suitable bearing 98 for rotatably supporting the driving member 12.

From the above description, it should be apparent that the gimbal member, main housing 30, and steering wheel 11 may be pivoted as a unit about the tilt-away axis 80 defined by the pins 90, 91. The movement of the gimbal 50 and steering wheel 11 about the tilt-away axis is effected by the universal joint 14. It should be noted that the tilt-away axis 80 is spaced below the axis of rotation of the universal joint and, thus, the forces applied to the driving member and driven member by the universal joint urge the driving member about the tilt-away axis in a like manner to that described above in connection with the tilt axis.

Movement of the gimbal member 50, and driving member 12 about the tilt-away axis, is prevented by a releasable latch means 100. The latch means 100 releasably latches the gimbal member 50 to the lower housing member 96 so as to prevent pivotal movement of the gimbal about the pivot axis defined by the pins 90, 91. The latch means 100 comprises a latch member 101 which is connected with the lower housing member 96 and functions to prevent movement of the gimbal by the universal joint 14. The latch member 101 is a lever member which is pivotally supported by a pivot pin 102 on the lower housing member 96. The pivot pin 102 is located intermediate the ends of the lever 101. One end 102a of the lever 101 extends adjacent to the gimbal member 50, and particularly the ring portion 51 of the gimbal member 50. The end 102a of the lever member 101 adjacent to the ring member 51 of the gimbal member 50 is adapted to be received in a slot 103 in the gimbal member 50 and blocks movement of the gimbal member 50 about the tilt-away axis.

The latch means 100 may be released to permit pivoting movement of the gimbal 50 about the axis of the pins 90, 91. The latch means 100 is released by pivoting the lever member 101 about the axis of pin 102 into the dot-dash position shown in FIG. 2 against the base of a spring member, not shown, urging the lever into the slot 103 in the gimbal member. Any suitable structure or arrangement may be provided for pivoting the lever member 101 about the pivot 102, and is herein shown, by way of example, as being pivoted by manually pressing on the end 105 of the lever member 101 which is opposite the end 102a thereof. The end 105 of the lever member 101 projects through an opening 106 in a suitable shroud or cover 107 which encloses the lower portion of the steering column and the driven member 13. It should be apparent from the above description that upon depressing the portion 105 of the lever member 101 into the opening 106, the lever member will pivot about the pivot pin 102 and the portion 102a thereof will be moved from the slot 103.

In response to movement of the lever end portion 102a from the slot 103, the gimbal member 50, when locked by latch means 60 to the driving member 12, and the driving member 12 pivot as a unit about the tilt-away axis defined by the pins 90, 91. The movement about the pins 90, 91 is effected by the action of the universal joint which applies a biasing force urging the driving member 12 about the axis of the pins 90, 91 because of the offset positioning of the tilt-away axis relative to the axis of the universal joint. This movement, of course, will effect movement of the steering wheel about the tilt-away axis to a position remote from the steering position and in a plane extending angularly with respect to the plane in which the steering wheel is moved when moved about the tilt axis.

Figures 9, 10, 11:
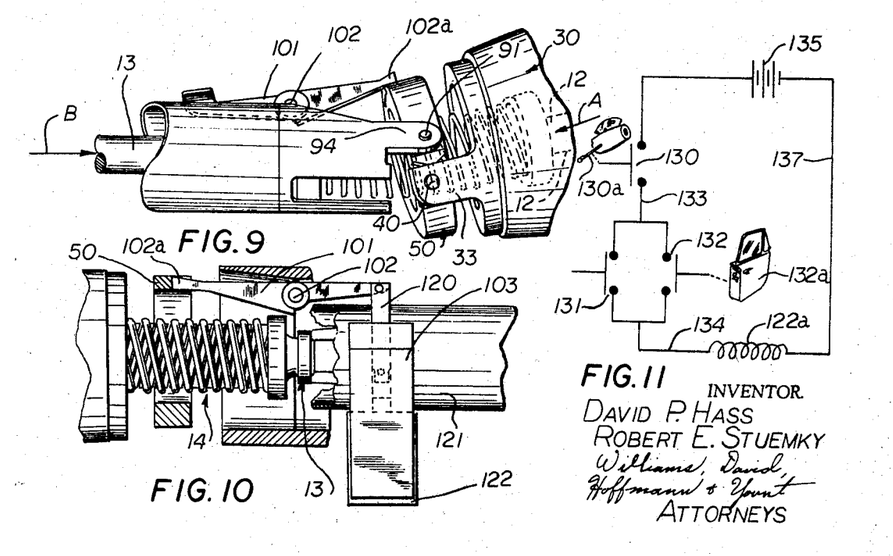
FIG. 10 is a fragmentary view of a modified steering mechanism embodying the present invention.
FIG. 11 is a schematic circuit diagram used in association with the steering mechanism of FIG. 10.

FIG. 9 shows the relative position of the parts when in their remote tilt-away position. The steering wheel 11 is returned to its normal steering position about the tilt-away axis 80 by the operator manually overcoming the bias of the universal joint 14 and pivoting gimbal 50 about the axis 80 to the position where the end 102a of the lever 101 snaps into the slot 103 in the gimbal member, at which position the steering wheel 11 will have been returned to its steering position.

The modified construction of the steering mechanism shown in FIG. 10 is similar in construction to the steering mechanism described hereinabove and illustrated in FIGS. 1–9 and the same reference numerals used to designate parts of the structure shown in FIGS. 1–9 are used to designate the corresponding parts in FIG. 10. The basic difference between the structure shown in FIGS. 1–9 and that shown in FIG. 10 is that the structure of FIG. 10 includes an automatic means for releasing the latch means for effecting tilt-away movement of the steering wheel. To this end, the lever member 101 at the end thereof remote from the gimbal member 50 is connected with a rod member 120. The member 120 is pivotally connected to the end of the lever 101 and extends vertically through the casing 121 which houses output member 13. The member 120 when moved endwise and downwardly, as viewed in FIG. 10, effects movement of the end 102a upwardly and releases the gimbal member 50 for pivotal movement by the lever 101.

The member 120 is moved to a position to release the lever member 101 to permit movement of the gimbal member by suitable automatically actuated power means. Preferably, the automatically actuated power means comprises a solenoid 122, although other means may be employed. The solenoid 122 is suitably secured in position to a bracket member 123 which, in turn, is secured to the casing member 121. The member 120 is suitably secured to the core of the solenoid and upon energization of the solenoid coil 122a is moved downwardly to release the lever 101, and effect upward movement of the end 102a of the lever 101 and thereby effect release of the gimbal member 50 for pivotal movement about the tilt-away axis.

The solenoid coil 122a is located in a suitable circuit for energizing the coil 122a when it is desired to tilt away the steering wheel of the vehicle. The circuit diagram which includes the solenoid coil 122a is illustrated in FIG. 11 and further includes a suitable switch 130, well known in the art, which is closed when the selector lever 130a of the vehicle, shown schematically in FIG. 11, is moved to a park position. The circuit also includes a normally open switch 131 which may be mounted on the dashboard of the vehicle in order to be manually closed by the operator of the vehicle, as well as a switch 132 which is normally open and which may be closed upon opening of the door 132a of the vehicle, shown schematically in FIG. 11. The mounting of the switch 132 may be in any conventional manner so as to effect closing of the switch when the door opens. The switches 131 and 132 are connected in parallel and are connected by a conductor 133 with the selector lever switch 130. The switch 130 is connected to one side of a battery 135. The switches 131 and 132 are also connected by a suitable conductor 134 with the solenoid coil 122a which is connected by a conductor 137 to the side of the battery 135 opposite the side which is connected with the switch 130.

From the above description, it should be apparent that upon moving the selector lever to the park position, the switch 130 is closed. Then, in order to tilt away the steering wheel, either switch 132 or 131 may be closed to complete the circuit from the battery to the solenoid coil 122a. The switch 131 may be manually actuated, since it is on the dashboard, to effect release of the gimbal member 50 for movement about the tilt-away axis. Alternatively, the switch 132 is automatically actuated, upon opening of the door of the vehicle to effect release of the gimbal member 50 for movement. In the event that the switch 131 is manually closed and the steering mechanism is tilted away, upon opening of the door of the vehicle, the switch 132 will likewise be closed and the solenoid coil will again be energized. However, energization of the solenoid coil at this time performs no function since the gimbal member is already released due to the actuation of the manually controlled switch 131 and moved to its tilt-away position. In order to return the steering mechanism to its normal position, it is necessary only to return the gimbal member 50 to the position shown in FIG. 10, as described hereinabove in connection with the mechanism in FIG. 1.

The above-described circuit thus permits the operator to put the vehicle gear selector lever in a park position without actuating the movement of the steering wheel to a tilt position until either the door of the vehicle is opened or the dashboard control switch is actuated.

The preferred embodiment of the present invention has been described hereinabove in considerable detail and certain modifications, changes, and adaptations may be made therein by those skilled in the art to which it relates, and it is hereby intended to cover all such changes, modifications, and adaptations which come within the scope of the appended claims.

Having described our invention, we claim:

1. A drive mechanism comprising a rotatable driven member, a rotatable driving member, means supporting said driving member for pivotal movement relative to said driven member about a pivot axis extending transverse to and offset from the axis of rotation of said driving member, and spring means operatively connected with said driven and driving members and both rotatable to transmit rotary motion therebetween and to bias said driving member about said pivot axis, said spring means applying an effective biasing force acting on said driving member at a location offset from said pivot axis to move said members from a substantially coaxial position to a non-coaxial position.

2. A drive mechanism comprising a rotatable driven member, a rotatable driving member, means supporting one of said members for pivotal movement from a position coaxial with the other of said members to a non-coaxial position relative to the other of said members about a pivot axis extending transverse to the axis of rotation of the driving member, and means operatively connected with said driven and driving members and acting between said members and rotatable to both transmit rotary motion therebetween and move said one of said members about said pivot axis, said last-mentioned rotatable means applying an effective force acting on said one of said members at a location offset from said pivot axis to move said one of said members from said coaxial position into said non-coaxial position.

3. A drive mechanism as defined in claim 2 wherein said rotatable means includes loaded coil spring means acting between said members.

4. A drive mechanism as defined in claim 3 further including releasable latching means for preventing movement of said driving member about said pivot axis by said loaded coil spring and releasable to allow for movement of said driving member about said pivot axis.

5. A drive mechanism comprising a rotatable driven member, a rotatable driving member, means supporting one of said members for pivotal movement relative to the other of said members about a pivot axis extending transverse to the axis of rotation of the driving member, means operatively connected with said driven and driving members and acting between said members and rotatable to both transmit rotary motion therebetween and move said one of said members about said pivot axis, said means applying an effective force acting on said one of said members at a location offset from said pivot axis and comprising universal joint spring means operatively connected with said driven and driving members and rotatable to transmit torque therebetween, said universal joint spring means including loaded coil spring means urging said driving and driven members about said pivot axis and applying a force to said members acting generally axially thereof.

6. A steering mechanism for a vehicle having a steering wheel comprising a rotatable driven member, a rotatable driving member adapted to be connected with the steering wheel of the vehicle for rotation upon rotation of the steering wheel, means supporting said driving member for pivotal movement relative to said driven member about a pivot axis extending transverse to the axis of rotation of the driving member, means operatively connected with said driven and driving members and acting between said members and operable to transfer rotary motion therebetween and including means for moving said driving member and steering wheel about said pivot axis, releasable latch means for preventing movement of said driving member and steering wheel about said axis and releasable to allow for said movement of said driving member about said pivot axis, said means connected with said driven and driving members comprising universal joint spring means operatively connected with said driven and driving members and said universal joint spring means including loaded coil spring means acting between said members and operable to transfer rotary motion therebetween and urge said driving member and steering wheel for pivotal movement about said pivot axis.

7. A steering mechanism for a vehicle as defined in claim 6 wherein said releasable latch means includes a latch member movable to a latch release position and a turn signal actuating lever operatively connected with the latch member and movable to effect movement of the latch member to its latch release position.

8. A steering mechanism as defined in claim 6 wherein said releasable latch means includes a latch member having a latch release position and movable to its latch release postion to effect release of the latch means, and means for moving the latch member to its latch release position including power means operatively connected to the latch member and circuit means for actuating said power means.

9. A steering mechanism as defined in claim 8 wherein said circuit means includes first switch means closed in response to movement of the vehicle selector gear lever to its park position and second switch means in series with said first switch means and supported at a remote position off said steering column.

10. A steering mechanism as defined in claim 8 wherein said circuit means includes first switch means closed in response to movement of the vehicle sector gear lever to its park position and second switch means in series with said first switch means and closed in response to opening of the vehicle door.

11. A drive mechanism comprising a driving member, a driven member, universal joint spring means interconnecting said driving and driven members and operable to transmit torque therebetween, means supporting said driving member for pivotal movement about a pivot axis extending transverse to the axis of rotation of said universal joint and offset from the axis of rotation of said universal joint including a housing member rotatably receiving said driving member and having projecting portions projecting on opposite sides of said universal joint and terminating intermediate the ends of the universal joint, a member connected with said driving member and encircling said universal joint intermediate the ends theerof adjacent to the termination of said projecting portions of said housing, pin members interconnecting said portions of said housing and said member and providing said pivot axis, said universal joint spring means including loaded coil spring means urging said driving and driven members for relative pivotal movement about said pivot axis, and latch means for releasably latching said housing member to said member and including a first latch member connected to said member and a second latch member movably connected to said main housing and movable relative to the first latch member to effect release of said latch means.

12. A drive mechanism comprising a driving member, a driven member, universal joint means interconnecting said driving and driven members and operable to transmit torque therebetween and apply an axial force to said members urging said members together, means supporting said driving member for pivotal movement about a pivot axis extending transverse to the axis of rotation of said universal joint and offset from the axis of rotation of said universal joint including a housing member rotatably receiving said driving member and having portions projecting on opposite sides of said universal joint and terminating intermediate the ends of the universal joint, a gimbal member connected with said driving member and encircling said universal joint intermediate the ends thereof adjacent to the termination of said portions of said housing, pin members interconnecting said portions of said housing and said gimbal member and providing said offset pivot axis, and latch means for releasably latching said housing member to said gimbal member and including a first latch member connected to said gimbal member and a second latch member movably connected to said housing member and movable relative to the first latch member to effect release of said latch means and render said universal joint operable to effect pivoting of said driving member about said pivot axis.

13. A drive mechanism comprising a driving member, a driven member, universal joint means interconnecting said driving and driven members and operable to transmit torque therebetween, means supporting said driving member for pivotal movement about a first pivot axis extending transverse to the axis of rotation of said universal joint and offset from the axis of rotation of said universal joint including a first housing member rotatably receiving said driving member and having portions projecting on opposite sides of said universal joint and terminating intermediate the ends of the universal joint, a gimbal member encircling said universal joint intermediate the ends thereof adjacent to the termination of said portions of said housing, pin members interconnecting said portions of said first housing member and said gimbal and providing said first offset pivot axis, first latch means for releasably latching said first housing member to said gimbal member and including a first latch member connected to said gimbal member and a second latch member movably connected to said housing member and movable relative to the first latch member to effect release of said latch means, a second housing member supporting said driven member including projecting portions extending toward said gimbal member and pivotally connected thereto so as to permit pivotal movement of the gimbal member relative to said second housing member about a second pivot axis extending transverse to the axis of rotation of the universal joint and offset therefrom and angularly related to said first pivot axis, and second latch means operable to latch said second housing member and said gimbal member to prevent movement of said gimbal member relative thereto about said second offset pivot axis and releasable to permit pivotal movement of said gimbal member reactive thereto.

14. A drive mechanism as defined in claim 13 wherein said universal joint is of the spring type and biases said driving member about said second pivot axis and said gimbal member when said first latch means is in latching engagement about its pivot axis relative to said second housing member.

15. A drive mechanism as defined in claim 13 wherein said gimbal member has a gimbal projecting portion extending into said housing and said first latch member is connected to said gimbal projecting portion and said second latch member being located in said housing.

16. A drive mechanism as defined in claim 13 wherein said second latch means comprises a lever member supported for pivotal movement relative to said driving members and said gimbal member and said gimbal member includes means defining a slot receiving an end portion of said lever member which when located in said slot blocks pivotal movement of the gimbal member relative thereto and when pivoted out of said slot permits pivotal movement of said gimbal member about said second pivot axis.

17. A drive mechanism comprising a rotatable driven member, a rotatable driving member, means supporting said driving member for pivotal movement about a plurality of axes extending transverse to the axis of rotation of the driving member, and means operatively connected to said driving and driven members and rotatable to transmit torque therebetween and including means acting between said members and urging said driving member for pivotal movement about said pivot axes with the effective force applied to said driving member acting thereon at a location offset from said pivot axes.

18. A drive mechanism as defined in claim 17 further including separate releasable latch means operable to latch said driving member from pivotal movement about each of said axes and independently releasable to provide for movement about said axes.

19. A drive mechanism as defined in claim 17 wherein said driving member supports a steering wheel and constitutes a portion of a steering column and pivoting movement of said driving member effects adjustment of the position of the steering wheel.

20. A steering mechanism for a vehicle comprising a rotatable driven member, a rotatable driving member adapted to be connected to the steering wheel of the vehicle, means supporting said driving member for pivotal movement about a plurality of axes extending transverse to the axis of rotation of the driving member, and means operatively connected to said driving and driven members and rotatable to transmit torque therebetween and including means acting between said members and urging said driving member for pivotal movement about said pivot axes with the effective force applied to said driving member acting thereon at a location offset from said pivot axes.

21. A steering mechanism for a vehicle having a steering wheel comprising a rotatable driven member, a rotatable driving member adapted to be connected with the steering wheel of the vehicle for rotation upon rotation of the steering wheel, means supporting said driving member for pivotal movement from a position coaxial with said driven member to a non-coaxial position relative to said driven member about a pivot axis offset from and extending transverse to the axis of rotation of the driving member, means operatively connected with said driven and driving members and acting between said members and operable to transfer rotary motion therebetween and including means applying an effective force acting on said driving member for moving said driving member and steering wheel about said pivot axis from said coaxial position into said non-coaxial position, and releasable latch means for preventing movement of said driving member and steering wheel about said axis and releasable to allow for said movement of said driving member about said pivot axis.

22. A steering mechanism for a vehicle having a steering wheel comprising a rotatable driven member, a rotatable driving member adapted to be connected with the steering wheel of the vehicle for rotation upon rotation of the steering wheel, means supporting said driving member for pivotal movement relative to said driven member about a pivot axis extending transverse to the axis of rotation of the driving member, universal joint means operatively connected with said driven and driving members and rotatable to transfer rotary motion therebetween, releasable latch means for retaining said driving member and steering wheel in position about said axis and releasable to provide for movement of said driving member about said pivot axis, said releasable latch means including a latch member movable to a latch release position, a turn signal actuating member rotatable to effect actuation of the vehicle turn signals, a block member connected with said actuating member for rotation therewith and for linear movement relative thereto, and a turn signal actuating lever operatively connected with said block member and movable in one direction to effect linear movement of the block member relative to said actuating member to effect movement of said latch member to its latch release position and movable in another direction transverse to said one direction relative to said latch member to rotate said block member and said turn signal actuating member to effect actuation of the vehicle turn signals.

23. A steering mechanism as defined in claim 22 wherein said turn signal actuating member is carried by a rotatable member having a slot therein, and said block member is located in said slot and movable linearly therein in said one direction relative to said turn signal actuating member.

24. A drive mechanism comprising a driving member, a driven member, first support means supporting said driving member for rotation relative thereto, second support means supporting said driven member for rotation relative thereto, power transmitting means interconnecting said driving and driven members and operable to trasmit rotary motion therebetween, a member interposed betwen the driving and driven members and having a first pivotal connection with said first support means on the external periphery thereof and providing for relative pivotal movement between said first support means and said member about a first axis, and a second pivotal connection on the external periphery thereof with said second support means and providing for relative pivotal movement between said second support means and said member about a second axis angularly disposed with respect to said first pivot axis, said first and second pivot axes intersect at an acute angle.

25. A drive mechanism as defined in claim 24 wherein said power transmitting means comprises a universal joint of the spring type which includes a plurality of coil springs connected with said driving and driven members for transmitting rotary motion therebetween.

26. A drive mechanism as defined in claim 24 wherein at least one of said pivot axes is offset from the axis of rotation of said driven member and said power transmitting means is operable to urge said driven and driving members for relative movement about said at least one offset pivot axis.

27. A steering mechanism for a vehicle having a steering wheel comprising a rotatable driven member, a rotatable driving member adapted to be connected with the steering wheel of the vehicle, means supporting said driving member for pivotal movement relative to said driven member about a pivot axis extending transverse to the axis of rotation of the driving member, universal joint means operatively connected with said driven and driving members to transfer rotary motion therebetween, releasable latch means for preventing movement of said driving member and steering wheel about said axis and releasable to provide for movement of said driving member about said pivot axis, said releasable latch means including a latch member movable to a latch release position, power means for moving said latch member to its latch release position, and circuit means for actuating said power means and including first switch means actuated by movement of the vehicle selector gear lever to its park position, second switch means connected with said first switch means and when closed providing a circuit for actuating said power means, said second switch means comprising a manually controlled switch located on the dash board of the vehicle, and a third switch means connected in series with said first switch means and in parallel with said second switch means and closed in respose to opening of the door of the vehicle.

28. A steering mechanism for a vehicle having a steering wheel comprising a rotatable driven member, a rotatable driving member adapted to be connected with the steering wheel of the vehicle, means supporting said driving member for pivotal movement relative to said driven member about a pivot axis extending transverse to the axis of rotation of the driving member, universal joint means operatively connected with said driven and driving members to transfer rotary motion therebetween, releasable latch means for preventing movement of the driving member and steering wheel about said pivot axis, said releasable latch means including a part connected with said driving member for pivotal movement therewith about said pivot axis and a latch member cooperable with said part and movable relative thereto to a latch release position, a solenoid operatively connected with said latch member and energizable to move said latch member to its latch release position, and circuit means for energizing said solenoid and including a first switch means actuated by movement of the vehicle selector gear lever to its park position and a vehicle door-operated switch means closed in response to opening of the vehicle door and connected with said first switch means and providing a circuit for actuating said solenoid.

References Cited

UNITED STATES PATENTS

| | | | |
|---|---|---|---|
| 459,152 | 9/1891 | Campbell | 64—2 |
| 1,705,984 | 3/1929 | Lindsay | 64—15 |
| 3,000,197 | 9/1961 | Ruegg et al. | 64—15 |
| 3,167,971 | 2/1965 | Zeigler et al. | 74—493 |
| 3,199,625 | 8/1965 | Liebreich | 180—78 X |
| 3,222,472 | 12/1965 | Elliott. | |
| 3,245,228 | 4/1966 | Stuemsky et al. | 64—15 |
| 3,252,350 | 5/1966 | Zeigler | 74—493 |
| 2,494,324 | 1/1950 | Wright. | |

A. HARRY LEVY, *Primary Examiner.*

U.S. Cl. X.R.

74—493; 180—78; 64—2, 15; 180—112

UNITED STATES PATENT OFFICE
CERTIFICATE OF CORRECTION

Patent No. 3,425,504

February 4, 1969

David P. Hass et al.

It is certified that error appears in the above identified patent and that said Letters Patent are hereby corrected as shown below:

Column 10, line 74, "sector" should read -- selector --. Column 12, line 10, "reactive" should read -- relative --. Column 14, line 28, "respose" should read -- response --.

Signed and sealed this 31st day of March 1970.

(SEAL)
Attest:

Edward M. Fletcher, Jr.
Attesting Officer

WILLIAM E. SCHUYLER, JR.
Commissioner of Patents